US011500619B1

(12) United States Patent
Abdelaziz et al.

(10) Patent No.: US 11,500,619 B1
(45) Date of Patent: Nov. 15, 2022

(54) INDEXING AND ACCESSING SOURCE CODE SNIPPETS CONTAINED IN DOCUMENTS

(71) Applicant: International Business Machines Corporation, Armonk, NY (US)

(72) Inventors: Ibrahim Abdelaziz, Tarrytown, NY (US); Julian Timothy Dolby, Bronx, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/327,818

(22) Filed: May 24, 2021

(51) Int. Cl.
*G06F 8/36* (2018.01)
*G06F 16/901* (2019.01)
*G06F 8/33* (2018.01)

(52) U.S. Cl.
CPC .............. *G06F 8/36* (2013.01); *G06F 8/33* (2013.01); *G06F 16/9024* (2019.01)

(58) Field of Classification Search
CPC ... G06F 8/33; G06F 8/36; G06F 8/751; G06F 16/9024
See application file for complete search history.

(56) References Cited

U.S. PATENT DOCUMENTS

| 8,122,433 | B2 | 2/2012 | Bank |
| 9,606,990 | B2 | 3/2017 | Allen |
| 10,169,036 | B2 | 1/2019 | Frenkiel |

(Continued)

FOREIGN PATENT DOCUMENTS

| CN | 106843840 A | 6/2017 |
| CN | 107341014 A | 11/2017 |

(Continued)

OTHER PUBLICATIONS

Dennis Shasha et al. "Algorithmics and applications of tree and graph searching," 2002 [retrieved on Mar. 23, 2022], Proceedings of the 21st ACM SIGMOD-SIGACT-SIGART symposium on Principles of database systems, pp. 39-52, downloaded from <url>:https://dl.acm.org. (Year: 2002).*

(Continued)

*Primary Examiner* — S. Sough
*Assistant Examiner* — Stephen D Berman
(74) *Attorney, Agent, or Firm* — Fleit Intellectual Property Law; Jeffrey N. Giunta

(57) ABSTRACT

Systems and methods for indexing and accessing code snippets in repositories. A program graph index is maintained for code snippets within a repository with documents that have at least one code snippet. The program graph index includes a program graph indicating a relationship between program elements within each source code snippet within the documents. A user provided code snippet is received and a target program graph indicating a relationship between program elements within the user provided code snippet is determined and compared to each respective program graph. Based on the comparison, an identified set of documents within the repository of documents is determined that have code snippets with respective program graphs that are also at least a sub-tree of the target program graph. At least one document in the identified set of documents is presented to a user.

20 Claims, 6 Drawing Sheets

(56) References Cited

U.S. PATENT DOCUMENTS

| | | | |
|---|---|---|---|
| 2006/0129603 A1 | 6/2006 | Park | |
| 2008/0288965 A1* | 11/2008 | Grechanik | G06F 8/36 |
| | | | 719/328 |
| 2013/0036129 A1* | 2/2013 | Havel | G06F 8/70 |
| | | | 707/E17.03 |
| 2016/0259630 A1* | 9/2016 | Roos | G06Q 10/101 |
| 2020/0348929 A1* | 11/2020 | Sousa | G06F 8/36 |

FOREIGN PATENT DOCUMENTS

| | | |
|---|---|---|
| CN | 109683946 A | 4/2019 |
| CN | 110399162 A | 11/2019 |
| CN | 111142850 A | 5/2020 |

OTHER PUBLICATIONS

Sunanda Mulik et al., "Comparison of Parsing Techniques For Formal Languages," 2011 [retrieved on Mar. 23, 2022], International Journal on Computer Science and Engineering (IJCSE), vol. 3, No. 4, pp. 1611-1615, downloaded from <url>:https://citeseerx.ist.psu.edu. (Year: 2011).*

Kevin Greenan, "Method-Level Code Clone Detection on Transformed Abstract Syntax Trees Using Sequence Matching Algorithms," 2005 [retrieved on Mar. 23, 2022], pp. 1-17, downloaded from <url>:https://citeseerx.ist.psu.edu. (Year: 2005).*

Wenhan Wang et al., "Detecting Code Clones with Graph Neural Network and Flow-Augmented Abstract Syntax Tree," 2020 [retrieved on Jul. 25, 2022], 2020 IEEE 27th International Conference on Software Analysis, Evolution and Reengineering, pp. 261-271, downloaded from <url>:https://ieeexplore.ieee.org. (Year: 2020).*

\* cited by examiner

US 11,500,619 B1

INDEXING AND ACCESSING SOURCE CODE SNIPPETS CONTAINED IN DOCUMENTS

BACKGROUND

The present disclosure generally relates to the field of accessing data in stored documents, and more particularly to facilitating access and discovery of data of interest in those stored documents.

Software developers seeking information regarding questions or problems they are encountering when writing code are able to search online repositories, such as forums, message boards, other compilations of information, or combinations of these, in an attempt to find help or answers. The information in these repositories is generally contained in a number of documents that each describe one or more particular programming solutions for a particular task, solutions to problems that others have encountered, other helpful information, or combinations of these. The information in these repositories is generally stored and indexed as plain text so that a user wishing to find information about a particular topic is limited to performing simple text searches of all documents in the repository.

Some examples of repositories contain information regarding the use of existing software components, such as pre-defined libraries of software functions, that can be incorporated into software being written. Such existing software is available in many forms and from many sources. In order to make use of the software contained in these existing components, many existing software components have interface function calls that are able to have different syntaxes for different uses. These repositories in some cases contain source code snippets that illustrate the use of the function calls. These snippets are usually incomplete portions of source code and cannot be complied or analyzed by conventional analysis software.

BRIEF SUMMARY

In one example, a method for indexing and accessing code snippets in repositories includes maintaining a program graph index for a number of code snippets within a repository of documents, where documents in the repository of documents have at least one respective code snippet and where the program graph index comprises a respective program graph indicating a relationship between program elements within each source code snippet within the repository of documents. A user provided code snippet is received and a target program graph indicating a relationship between program elements within the user provided code snippet is determined. The target program graph is compared to each respective program graph. Based on the comparing, an identified set of documents within the repository of documents is determined where each document in the identified set of documents includes a code snippet with a respective program graph that is at least a sub-tree of the target program graph. At least one document in the identified set of documents is presented to a user.

In further examples, an apparatus for indexing and accessing code snippets in repositories is configured to, when operating, perform the above method, and a computer program product for indexing and accessing code snippets in repositories includes a storage medium readable by a processing circuit and storing instructions for execution by a processing circuit for performing the above method.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

The following description presents example systems and methods that advantageously perform indexing and allow effective searching of documents in one or more repositories. As described below, examples of these systems and methods analyze documents stored in one or more repositories and create an index of program graphs where the program graphs reflect the semantics, structure, syntax, or combinations of these, of code snippets that are identified in those documents. This index of program graphs is stored and is able to be accessed and examined to support searches for code snippets that correspond to semantics, structure, syntax, or combinations of these desired by a user.

Examples of repositories from which documents are able to be indexed include various question and answer internet resources, such as web sites, that are directed to assist with various specialized tasks. For example, a number of internet resources are operated that allow users to post questions regarding a particular question or problem the user is dealing with and others in the community are able to post answers to help the original poster. Such internet resources are able to have a large collection of documents that present code snippets that illustrate source code to perform various tasks that are associated with the question or problem presented by the user posting the original question. The source code snippets contained in these documents are often too incomplete to be analyzed by conventional code analysis. Documents with source code snippets typically have text to describe what the snippet performs and, in some instances, provides an explanation of details that underly the semantics, structure, syntax, or combinations of these, that are used in the presented snippet.

The below described systems and methods allow a user to provide an example source code snippet that reflect the semantics, structure, syntax, or combinations of these, that the user desires to learn more about. In an example, the user is able to create this source code snippet in an Integrated Development Environment (IDE) in which the user is writing source code. The IDE in some examples is integrated with a system that performs the below described systems and methods and allows the user to submit his or her example source code snippet and receive information in documents about similar source code snippets that are contained in documents stored in the indexed repository.

Figure 1:
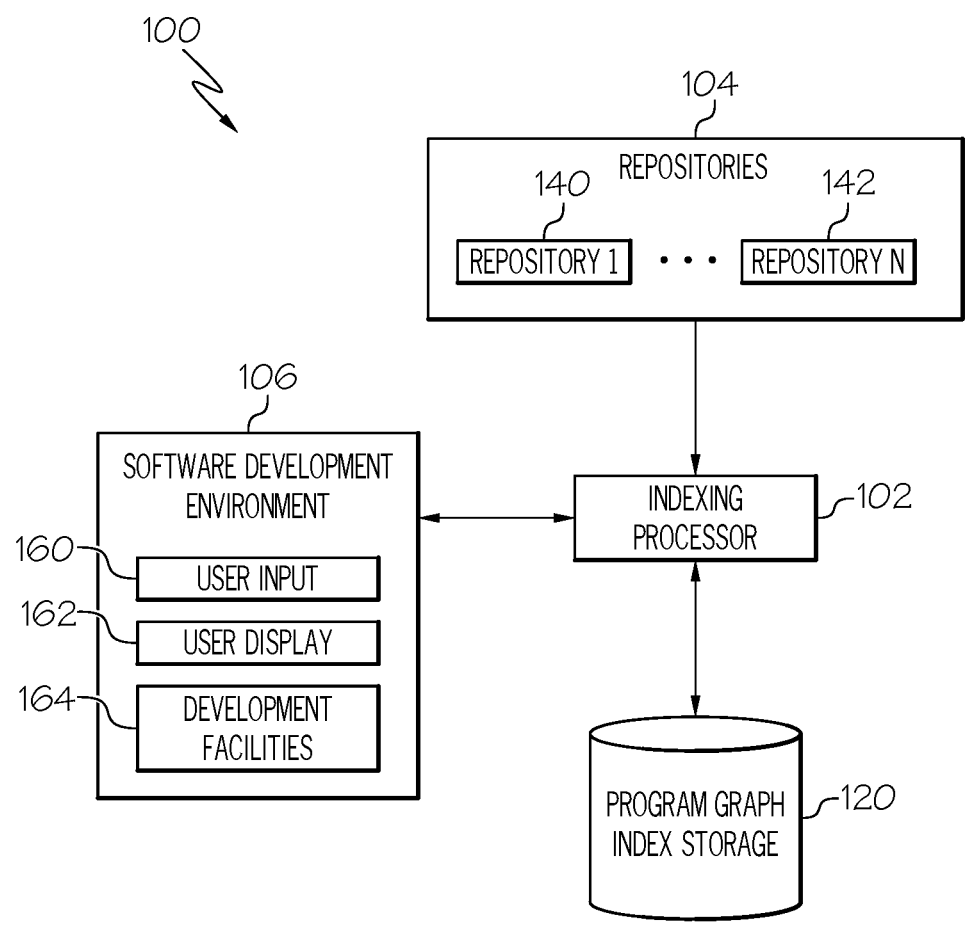
FIG. 1 illustrates a source snippet indexing and accessing system architecture, according to an example.

FIG. 1 illustrates a source snippet indexing and accessing system architecture 100, according to an example. The source snippet indexing and accessing system architecture 100 is an example of a system that performs the below described methods to index and provide searchable access to source code snippets stored in repositories.

The source snippet indexing and accessing system architecture 100 includes an indexing processor 102 that performs several of the operations described below. The indexing processor 102 in an example accesses one or more document repositories 104, such as the illustrated repository 1 140 and repository N 142. The document repositories 140 in an example store documents that contain one or more snippets of source code that serve as examples of the proper used of the elements that are contained in those snippets. In some examples, a particular document is also able to contain text that describe the use of elements contained in a snippet.

In general, the indexing processor 102 is able to access any number of repositories with which it has data communications. In various examples, one or more repositories are able to be located remotely from the indexing processor 102 where the indexing processor communicates via any suitable technique, such as internet communications, other data communications, or combinations of these. In some examples, one or more repository is able to be collocated with the indexing processor 102.

The indexing processor 102 operates with a program graph index storage 120. The program graph index storage 120 in an example stores data describing the program graphs for code snippets found in documents that are stored in the repositories 104. The program graph index storage is able to store this data in any suitable manner, such as in a database that describes graphs that indicates the program graph of each code snippet found in the documents of the document repositories 104. The data stored in the program graph index storage 120 advantageously facilitates more efficient and effective searching of source code snippets that are contained in documents.

In an example, the indexing processor 102 interoperates with a software development environment 106. The software development environment 106 includes a user input 160, which allows a user to provide information as input for processing, and a user display 162 that is used to present information to the user. In various examples, the user input 160 and user display 162 are able to include any facilities to support various types of user interface functions. The software development environment 106 also includes development facilities 164 as are familiar to practitioners. In an example, the software development environment is an Integrated Development Environment (IDE) that allows a software developer to efficiently perform various different operations that are involved in creating source code to develop or maintain software. The development facilities 164 includes the various functions used by a software developer to create and maintain software, such as editors, compilers, simulators, other tools, or combinations of these. Integrated Development Environments (IDEs) are known in the art and the present discussion will focus on features relevant to the below described systems and methods. In an example, the software development environment 106 is able to support a user entering a user provided source code snippet, such as via the user input 160, and provide that user provided source code snippet to the indexing processor 102.

The indexing processor 102 in an example determines one or more documents that contain information related to the user provided source code snippet and provides those one or more documents to the software development environment 106 for display, such as on the user display 162.

Figure 2:
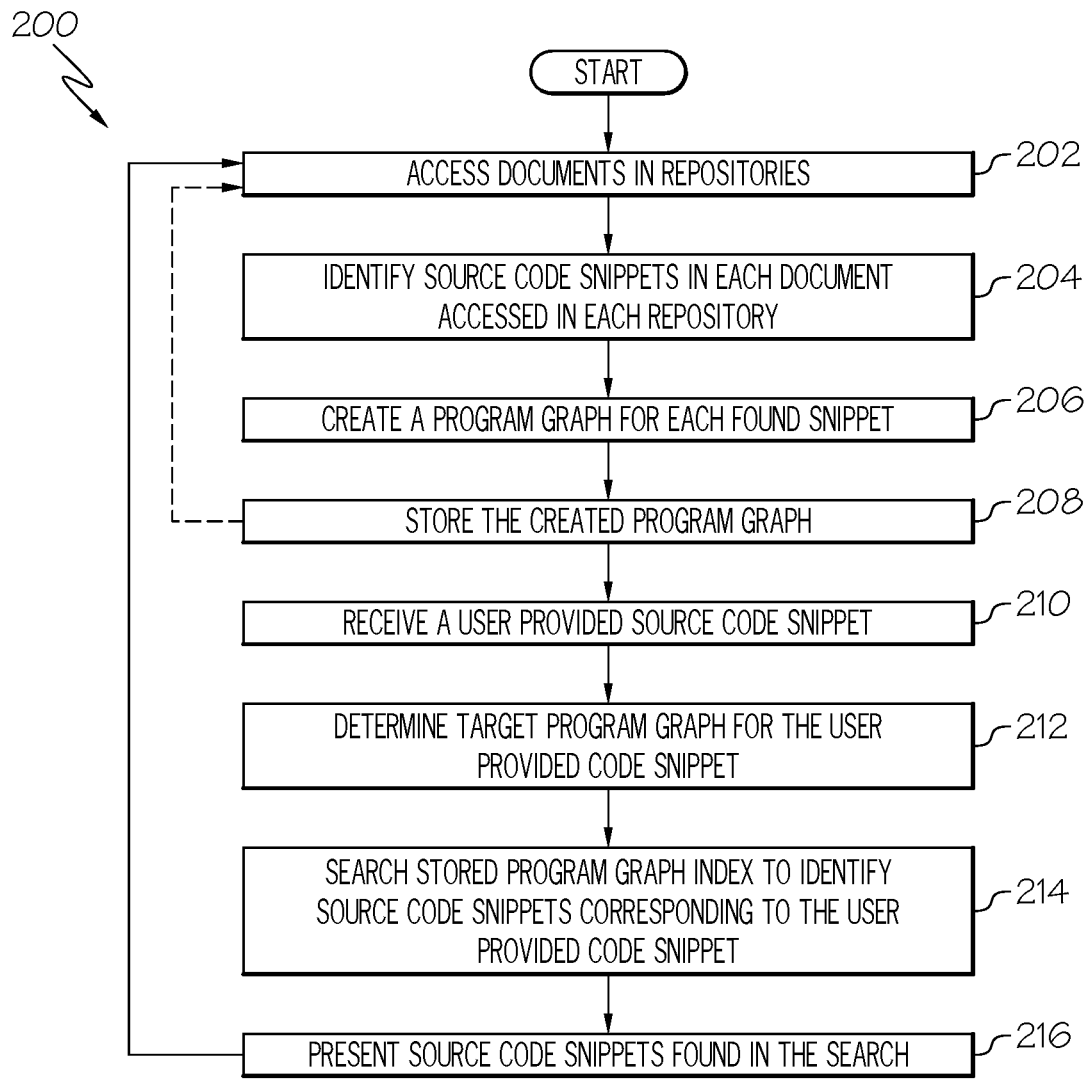
FIG. 2 illustrates a snippet indexing and searching process, according to an example.

FIG. 2 illustrates a snippet indexing and searching process 200, according to an example. The snippet indexing and searching process 200 illustrates an example of a high-level process flow for an example method to index and provide searchable access to source code snippets stored in repositories as well as providing search results based on example source code provided by a user, such as is performed by the indexing processor 102 discussed above.

The snippet indexing and searching process 200 begins in an example by accessing documents in repositories, at 202. The above described indexing processor 102 accessing repositories 104 is an example of this part of the snippet indexing and searching process 200. The snippet indexing and searching process 200 accesses and analyzes each document as is described below to identify and index source code snippets contained in those documents.

The snippet indexing and searching process 200 in an example identifies, at 204, source code snippets in each document accessed in each repository. In an example, source code snippets are identified by processing text in each document to identify text patterns that correspond to the syntax of one or more source code languages that are of interest. In various examples, a particular document found in the repository is able to have zero, one, or more than one source code snippet which would all be identified by this identification.

The snippet indexing and searching process 200 creates, at 206, a respective program graph for each snippet that is found in the documents in the repositories. Examples of such program graphs are described in further detail below.

The snippet indexing and searching process 200 stores, at 208, the created program graphs into a program graph index. The above described program graph index storage 120 is an example of a storage into which the created program graphs are to be stored.

In an example, the above processing is able to be performed prior to using the program graph index to access, find, and present source code snippets in the repositories that are of interest. For example, an indexing processor 102 is able to access all or many of the documents that are stored in one or more repositories and create indexes for source code snippets that are stored in those repositories. After that index is created and stored, such as in the program graph index storage 120 in an example, the following processing is able to be performed. In another example, the above processing is able to be performed concurrently with the use of the program graph index to find and access source code snippets that are of interest.

The snippet indexing and searching process 200 receives, at 210, a user provided code snippet. The user provided code snippet in an example is used as the specification of the characteristics of the source code snippets that the user desires to find and access using the snippet indexing and searching process 200.

A target program graph is determined, at 212, for the user provided source code snippet received above. The target program graph in an example is similar to the program graph that is determined for source code snippets found in documents in the repositories.

The stored program graph index is searched, at 214, based on the target program graph, to identify source code snippets that correspond to the user provided code snippet. In an example, this search identifies program graphs in the program graph index of which the target program graph is a sub-graph or where these two program graphs match.

Source code snippets that are found in the above search are presented, at 216. These source code snippets are identified in an example by the above search of the program graph index to identify source code snippets of interest. The presentation of matching source code snippets is able to include just the matching source code snippets, or other information along with the matching source the source code snippets such as part or all of other information contained in the document that contains the matching source code snippets. The snippet indexing and searching process 200 then ends.

Figure 3:
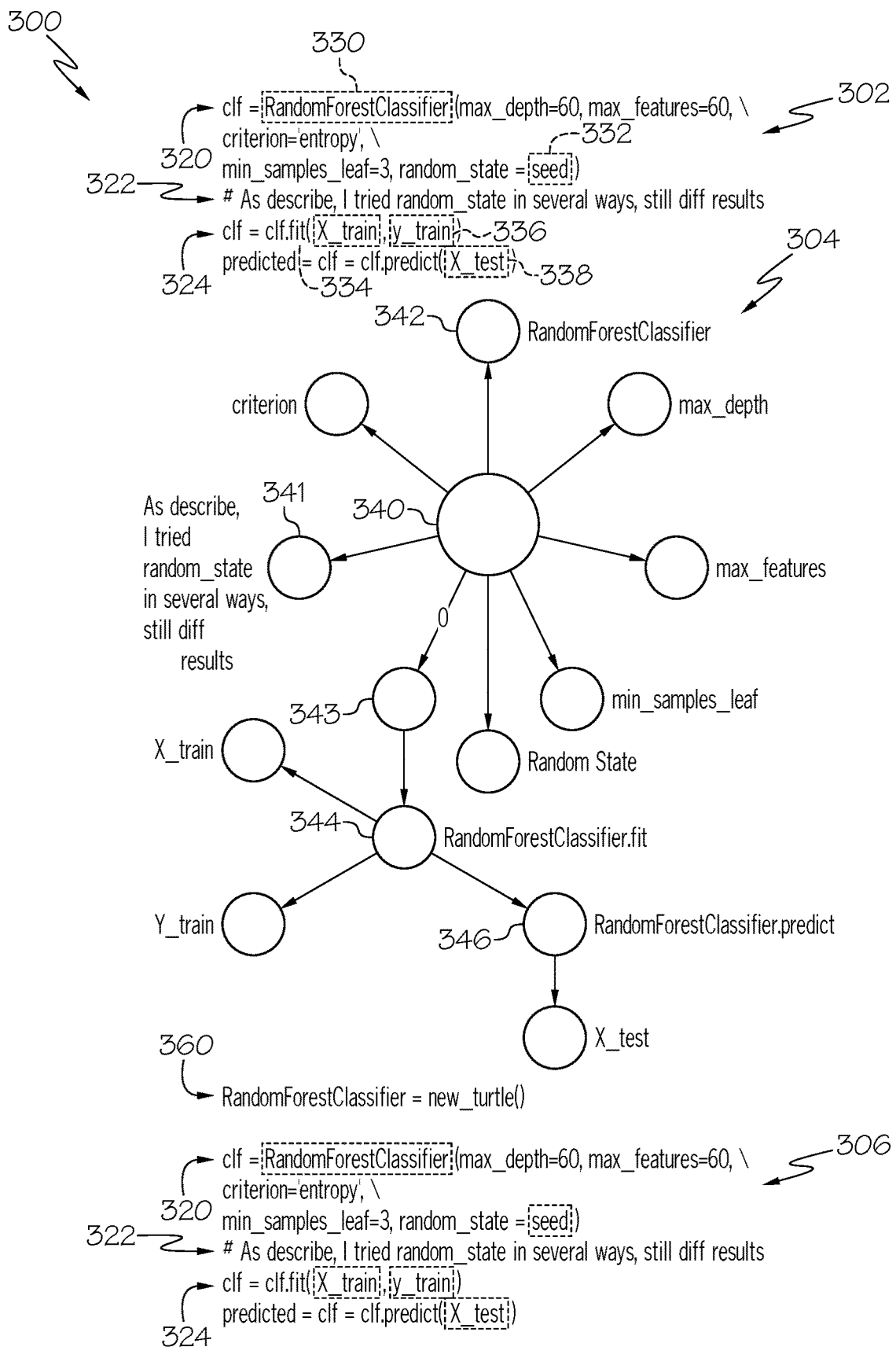
FIG. 3 illustrates a source code snippet processing, according to an example.

FIG. 3 illustrates a source code snippet processing 300, according to an example. The source code snippet processing 300 is an example of processing associated with processing to analyze documents accessed in a repository, such as the above described repositories 104, in order to identify source code snippets and determine program graph for each identified source code snippet.

The source code snippet processing 300 depicts a source code snippet 302. The source code snippet 302 in this example is a portion of source code that demonstrates several methods of a class "RandomForestClassifier." It is to be noted that the source code snippet 302 does not include all of the definitions that would be required to successfully compile and execute the snippet. In the illustrated source code snippet 302, several program elements whose values or data are being used but where those program elements have not been defined.

The illustrated source code snippet 302 identifies several program elements as undefined in this snippet. The object name RandomForestClassifier 330 is not defined within the scope of this snippet and is identified. Several arguments including "seed" 332, X_train 334, y_train 336 and X_test 338 are indicated. An attempt to compile or execute this source code snippet will fail because those program elements are not defined.

The processing of a source code snippet 302 in an example includes creating a source code program graph 304 that represents program elements, such as function names, parameters, data flow, control flow, source code program flow, other program elements, or combinations of these, for the source code snippet 302. The illustrated source code program graph 304 is an example of various types of representations that can be used to indicate relationships between program elements within a source code snippet. Examples of program graphs that are able to be used for this purpose include, but are not limited to, syntax hierarchy structures, program dependence graphs, value flow graphs, other structures, or combinations of these. An example of a program graph is referred to herein as an Abstract Syntax Tree (AST). The source code program graph 304 is depicted as a graph of program elements and the relationship those program elements have in the source code snippet 302. The source code program graph 304 has a root node 340 and a first leaf node 342 that indicates the first program element in the snippet. In this example, the first program element is the constructor for the RandomForestClassifier class, which is the element in the first leaf node 342. The root node 340 also has leaf nodes for each parameter passed to this constructor. The root node 340 further includes a supplemental information leaf node 341. The supplemental information leaf node 341 in some examples is able to contain any kind of data that indicates text surrounding the code snippet. The supplemental information leaf node 341 in this example includes the text of the comment provided in the source code snippet 302. In some examples, the supplemental information leaf node 341 is able to include any type of supplemental information regarding the source code snippet 302. In some examples, the supplemental information leaf node 341 is able to include one or more of a reference (e.g., a hyperlink) to the document in the repository from which the source code snippet 302 was extracted, other text contained in that document that is associated with the extracted source code snippet 302, other information, or combinations of these.

The source code program graph 304 has a first internal node 343 that represents the next line of the source code snippet 302. A second internal node 344 indicates the method performed by that line of source code, namely RandomForestClassifier.fit. The second internal node 344 further has two (2) leaf nodes indicating the parameters for the call to that method. The second internal node 344 also has a third internal node 346 that represents the next line of the source code snippet 302, which indicates the method RandomForestClassifier.predict. The second internal node 344 further has a leaf node for the parameter of that method call.

The source code snippet processing 300 also depicts an augmented source code snippet 306. The augmented source code snippet 306 includes all of the source code that is contained in the source code snippet 302 along with added program elements that allow the augmented source code snippet 306 to be complete and compile. In an example, program elements are added to the source code snippet 302 to provide definitions of the program elements that were not defined in the source code snippet 302 that was provided in the document found in the repository. The program elements added to source code snippets extracted from such documents are referred to herein as "turtles." In an example, a turtle is simply a minimal program element that provides a definition for undefined program elements in the source code snippet. In some examples, data, processing, other elements, or combinations of these, are able to be added to these turtles in order to provide a better functioning program based on the source code snippets being processed.

The illustrated augmented source code snippet 306 includes a first augmentation line 360 which defines the object RandomForestClassifier as an object with the name "new_turtle( )." In an example, a definition for new_turtle( ) (not shown) is able to be created and added to the source code snippet 302 such that a user is able to add further definition to the new_turtle( ) object. Only one turtle augmentation is shown for the illustrated augmented source code snippet 306 in order to simplify its presentation and description. In some examples, separate turtles, with unique names within the code snippet, are added in order to allow compilation and even execution of the augmented code snippet.

Figure 4:
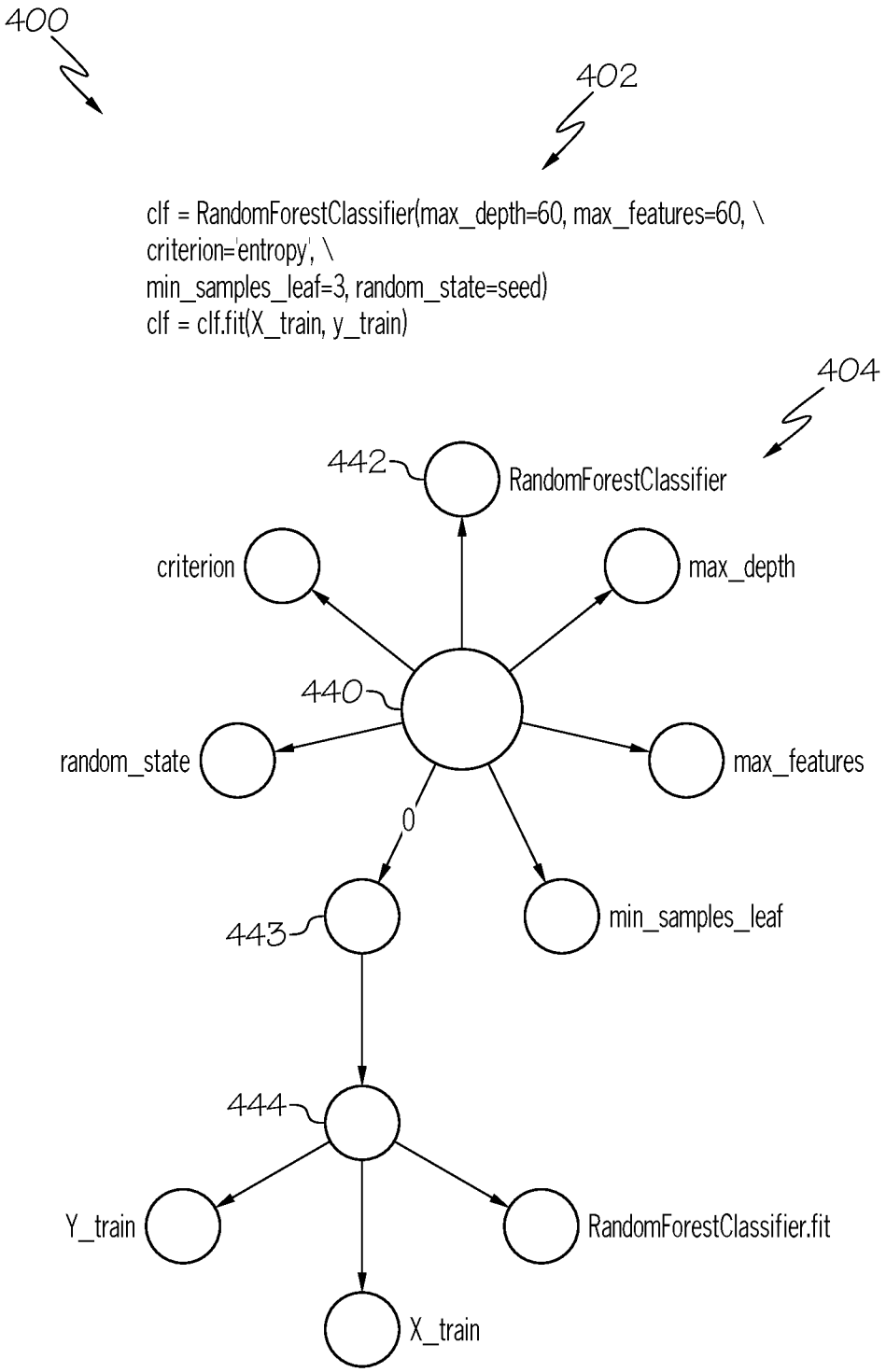
FIG. 4 illustrates a user provided code snippet processing, according to an example.

FIG. 4 illustrates a user provided code snippet processing 400, according to an example. The user provided code snippet processing 400 is an example of data flows associated with processing to characterize a source code snippet provided by a user that defines the source code snippets of which examples in documents contained in repositories are to be found. It is noted that in this illustrated example, the user provided code snippet processing 400 includes processing that is similar to parts of the above described source code snippet processing 300. In an example, the user provided code snippet processing 400 is performed on a user provided source code snippet that is provided to an indexing processor 102 from a software development environment 106.

The user provided code snippet processing 400 depicts a user provided source code snippet 402. The user provided source code snippet 402 in this example is a portion of source code that the user has created that uses a program element for which the user wishes to find examples in documents that are found in repositories, such as repositories 104. It is noted that the user provided source code snippet 402 in this example is a subset of the above discussed source code snippet 302.

The user provided code snippet processing 400 depicts a user provided source code program graph 404. The user provided source code program graph 404 is an example of a target program graph. The user provided source code program graph 404 is created in an example by the indexing processor 102 and due to the similarity of the user provided source code snippet 402 to the source code snippet 302, the user provided source code program graph 404 is similar to the above described source code program graph 304 but only includes nodes that correspond to source code elements in the user provided source code snippet 402. As such the user provided source code program graph 404 is a sub-graph of the source code program graph 304. As is described in further detail below, the indexing processor is able to advantageously compare the user provided source code program graph 404, which is a target program graph, to program graphs for all source code snippets that were found in documents in repositories to efficiently and effectively find relevant examples of source code that are similar to the user provided source code snippet 402.

Figure 5:
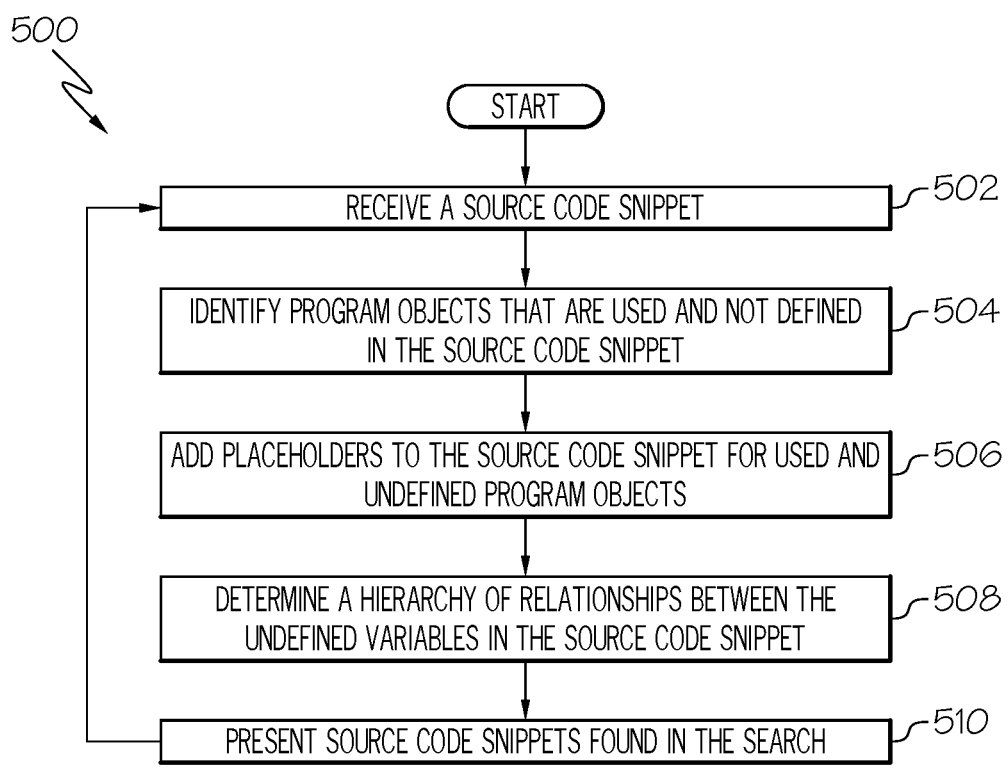
FIG. 5 illustrates a program graph creation process, according to an example.

FIG. 5 illustrates a program graph creation process 500, according to an example. The program graph creation process 500 is an example of a process performed by the indexing processor 102 as part of the create program graph 204 described above with regards to the snippet indexing and searching process 200.

The program graph creation process 500 includes receiving, at 502, a source code snippet. In an example, a source code snippet is received as a result of accessing document in a repository, processing the text in the document to identify one or more source code snippets that are contained in that document.

Program elements within the source code snippet that are used but not defined are identified, at 504. In some examples, program elements that are used but not defined include variables, object definitions, methods of object definitions, or other program elements, that are used as input to an operation within the source code snippet but for which the particular source code snippet does not provide a proper definition. Source code snippets provided in such repositories are often short portions of a larger source code file that focuses on the use of a particular programming object or construct, and the author assumes the reader is able to fill in the missing definitions to create a proper source code program.

Placeholders for used and undefined program elements are added to the source code snippet, at 506. Adding such placeholders are described above with regards to augmented source code snippet 306 as part of the source code snippet processing 300.

A hierarchy of relationships between the undefined variables in the source code snippet is determined, at 508. An example of such a hierarchy is described above with regards to the source code program graph 304 as described as part of the source code snippet processing 300.

The determined hierarchy of relationships is stored, at 510. In an example, the determined hierarchy of relationships is stored by adding it to the program graph index that is stored in the program graph index storage 120. The program graph creation process 500 then ends.

Information Processing System

Figure 6:
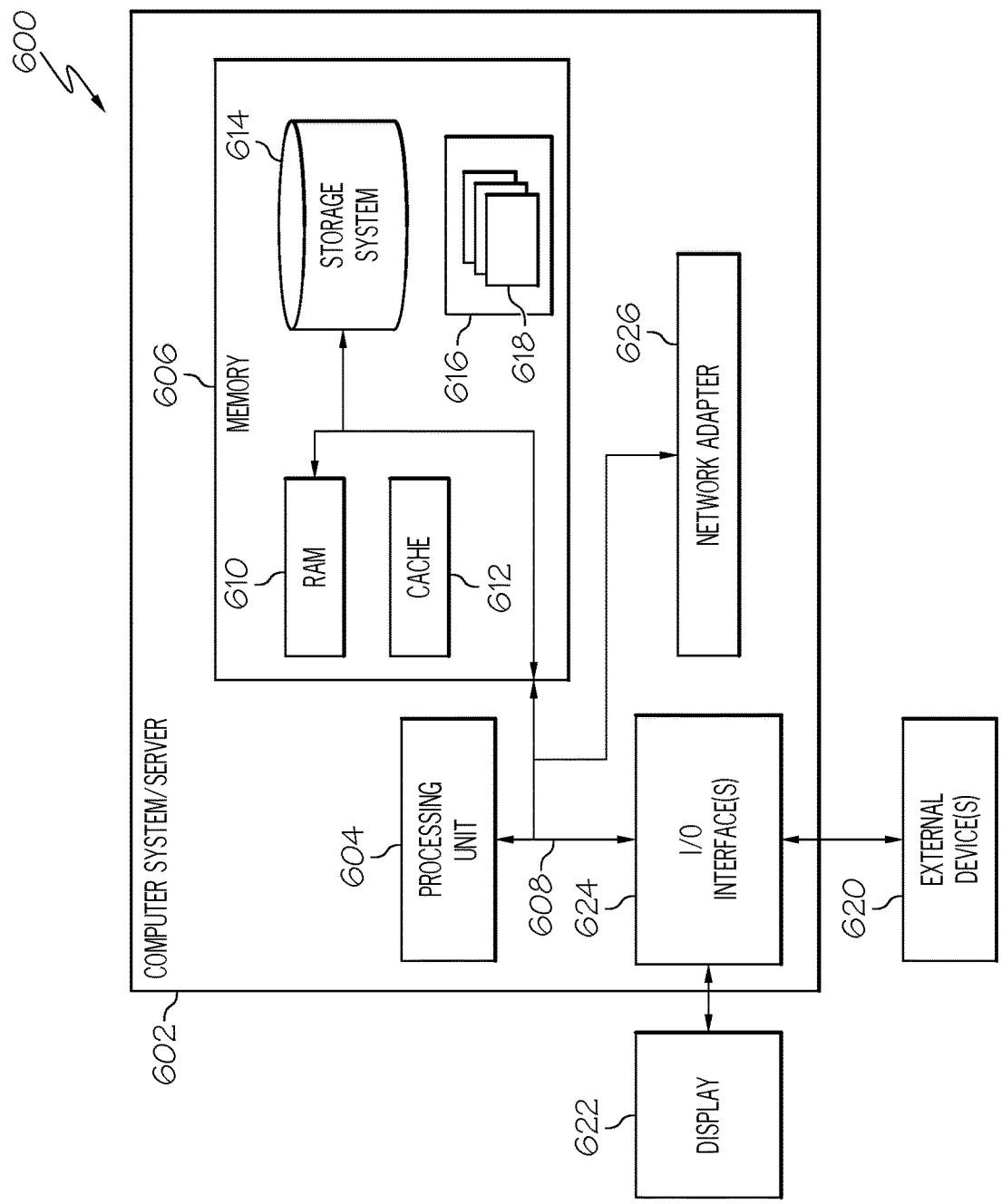
FIG. 6 is a block diagram illustrating one example of an information processing system according to one example.

Referring now to FIG. 6, this figure is a block diagram illustrating an information processing system that can be utilized in various examples of the present disclosure. The information processing system 602 is based upon a suitably configured processing system configured to implement one or more embodiments of the present disclosure. Any suitably configured processing system can be used as the information processing system 602 in embodiments of the present disclosure. In another embodiment, the information processing system 602 is a special purpose information processing system configured to perform one or more embodiments discussed above. The components of the information processing system 602 can include, but are not limited to, one or more processors or processing units 604, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 606 can also include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of various examples described above.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of the above described processes and systems.

The information processing system 602 can also communicate with one or more external devices 620 such as a keyboard, a pointing device, a display 622, and the like. The information processing system 602 is further able to communicate with one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for indexing and accessing code snippets in repositories, the method comprising:
    maintaining a program graph index for a plurality of code snippets within a repository of documents, where each of the documents in the repository of documents comprise at least one respective code snippet and where the program graph index comprises one or more respective program graphs indicating relationships between program elements within each respective source code snippet within the repository of documents;
    identifying an identified program element that is used and undefined within a particular respective code snippet within the at least one respective code snippet;
    creating an augmented code snippet by adding, to the particular respective code snippet, a placeholder for the identified program element;
    determining a hierarchy of relationships between the placeholder and the particular respective code snippet;
    creating an augmented program graph by adding the hierarchy of relationships to a respective program graph for the particular respective code snippet;
    storing the augmented program graph into the program graph index;
    receiving a user provided code snippet;
    determining a target program graph indicating relationships between program elements within the user provided code snippet;
    comparing the target program graph to each of the respective program graphs and the augmented program graph in the program graph index;
    determining, based on the comparing, an identified set of documents within the repository of documents, where each document in the identified set of documents comprises a code snippet with a respective program graph, of the one or more respective program graphs, that comprises at least a sub-tree of the target program graph; and
    presenting at least one document in the identified set of documents to a user.

2. The method of claim 1, further comprising receiving the user provided code snippet from a software development environment, and
    where the presenting is performed within the software development environment.

3. The method of claim 1, where maintaining the program graph index comprises allowing syntax errors in parsing one or more code snippets in one or more documents within the repository of documents.

4. The method of claim 1, where each of the respective program graphs comprises a respective graph indicating at least one of a respective data flow or respective control flow within a corresponding respective code snippet, and where the target program graph comprises a respective graph indicating the at least one of the respective data flow or respective control flow within the user provided code snippet.

5. The method of claim 4, where each code snippet in the plurality of code snippets comprises respective code to call at least one respective method of an object, and where the respective graph indicating at least one of data or control flow within the code snippet between methods and data used in calling each respective method.

6. The method of claim 1, where at least one program graph in the program graph index comprises data indicating text surrounding a respective code snippet within a respective document containing the respective code snippet.

7. The method of claim 6, wherein the data indicating text surrounding the respective code snippet comprises a hyperlink to the respective document containing the respective code snippet.

8. An apparatus for indexing and accessing code snippets in repositories, the apparatus comprising:
    a processor;
    a memory coupled to the processor;
    a user interface coupled to the processor and the memory that is configured to, when operating: receive a user provided code snippet; and
    present at least one document in an identified set of documents within a repository of documents to a user; and
    an indexing processor, coupled to the processor and the memory, that when operating is configured to:
    maintain a program graph index for a plurality of code snippets within the repository of documents, where documents in the repository of documents comprise at least one respective code snippet and where the program graph index comprises one or more respective program graphs indicating a relationship between program elements within each source code snippet within the repository of documents;
    identify an identified program element that is used and undefined within a particular respective code snippet within the at least one respective code snippet;
    create an augmented code snippet by adding, to the particular respective code snippet, a placeholder for the identified program element;
    determine a hierarchy of relationships between the placeholder and the particular respective code snippet;

create an augmented program graph by adding the hierarchy of relationships to a respective program graph for the particular respective code snippet;

store the augmented program graph into the program graph index;

determine a target program graph indicating a relationship between program elements within the user provided code snippet;

compare the target program graph to each of the respective program graphs and the augmented program graph in the program graph index; and determine, based on the comparison of the target program graph and each respective program graph, the identified set of documents within the repository of documents, where each document in the identified set of documents comprises a code snippet with a respective program graph, of the one or more respective program graphs, that comprises at least a sub-tree of the target program graph.

9. The apparatus of claim 8, where the user interface is further configured to, when operating:

receive the user provided code snippet from a software development environment, and wherein the presenting is performed within the software development environment.

10. The apparatus of claim 8, where maintaining the program graph index comprises allowing syntax errors in parsing one or more code snippets in one or more documents within the repository of documents.

11. The apparatus of claim 8, where each of the respective program graphs comprises a respective graph indicating at least one of a respective data flow or respective control flow within a corresponding respective code snippet, and where the target program graph comprises a respective graph indicating the at least one of the respective data flow or respective control flow within the user provided code snippet.

12. The apparatus of claim 11, where each code snippet in the plurality of code snippets comprises respective code to call at least one respective method of an object, and where the respective graph indicating at least one of data or control flow within the code snippet between methods and data used in calling each respective method.

13. The apparatus of claim 8, where at least one program graph in the program graph index comprises data indicating text surrounding a respective code snippet within a respective document containing the respective code snippet.

14. The apparatus of claim 13, wherein the data indicating text surrounding the respective code snippet comprises a hyperlink to the respective document containing the respective code snippet.

15. A computer program product for indexing and accessing code snippets in repositories, the computer program product comprising: a storage medium readable by a processing circuit and storing instructions for execution by the processing circuit for performing a method comprising:

maintaining a program graph index for a plurality of code snippets within a repository of documents, where documents in the repository of documents comprise at least one respective code snippet and where the program graph index comprises one or more respective program graphs indicating a relationship between program elements within each source code snippet within the repository of documents;

identifying an identified program element that is used and undefined within a particular respective code snippet within the at least one respective code snippet;

creating an augmented code snippet by adding, to the particular respective code snippet, a placeholder for the identified program element;

determining a hierarchy of relationships between the placeholder and the particular respective code snippet;

creating an augmented program graph by adding the hierarchy of relationships to a respective program graph for the particular respective code snippet;

storing the augmented program graph into the program graph index;

receiving a user provided code snippet;

determining a target program graph indicating a relationship between program elements within the user provided code snippet; comparing the target program graph to each of the respective program graphs and the augmented program graph in the program graph index;

determining, based on the comparing, an identified set of documents within the repository of documents, where each document in the identified set of documents comprises a code snippet with a respective program graph, of the one or more respective program graphs, that comprises at least a sub-tree of the target program graph; and presenting at least one document in the identified set of documents to a user.

16. The computer program product of claim 15, where the method further comprises receiving the user provided code snippet from a software development environment, and where the presenting is performed within the software development environment.

17. The computer program product of claim 15, where maintaining the program graph index comprises allowing syntax errors in parsing one or more code snippets in one or more documents within the repository of documents.

18. The computer program product of claim 15, where at least one program graph in the program graph index comprises data indicating text surrounding a respective code snippet within a respective document containing the respective code snippet.

19. The computer program product of claim 15, where each of the respective program graphs comprises a respective graph indicating at least one of a respective data flow or respective control flow within a corresponding respective code snippet, and where the target program graph comprises a respective graph indicating the at least one of the respective data flow or respective control flow within the user provided code snippet.

20. The computer program product of claim 19, where each code snippet in the plurality of code snippets comprises respective code to call at least one respective method of an object, and where the respective graph indicating at least one of data and or control flow within the code snippet between methods and data used in calling each respective method.

* * * * *